June 6, 1961   E. R. BUXTON ET AL   2,987,048
PARALLEL DRIVE ACTUATOR FOR FLIGHT CONTROL SYSTEMS
Filed Oct. 20, 1959   3 Sheets-Sheet 1

INVENTORS
ELLIOTT R. BUXTON
GREENLEAF W. SARGENT
BY
*Edward A. Sokolski*
AGENT

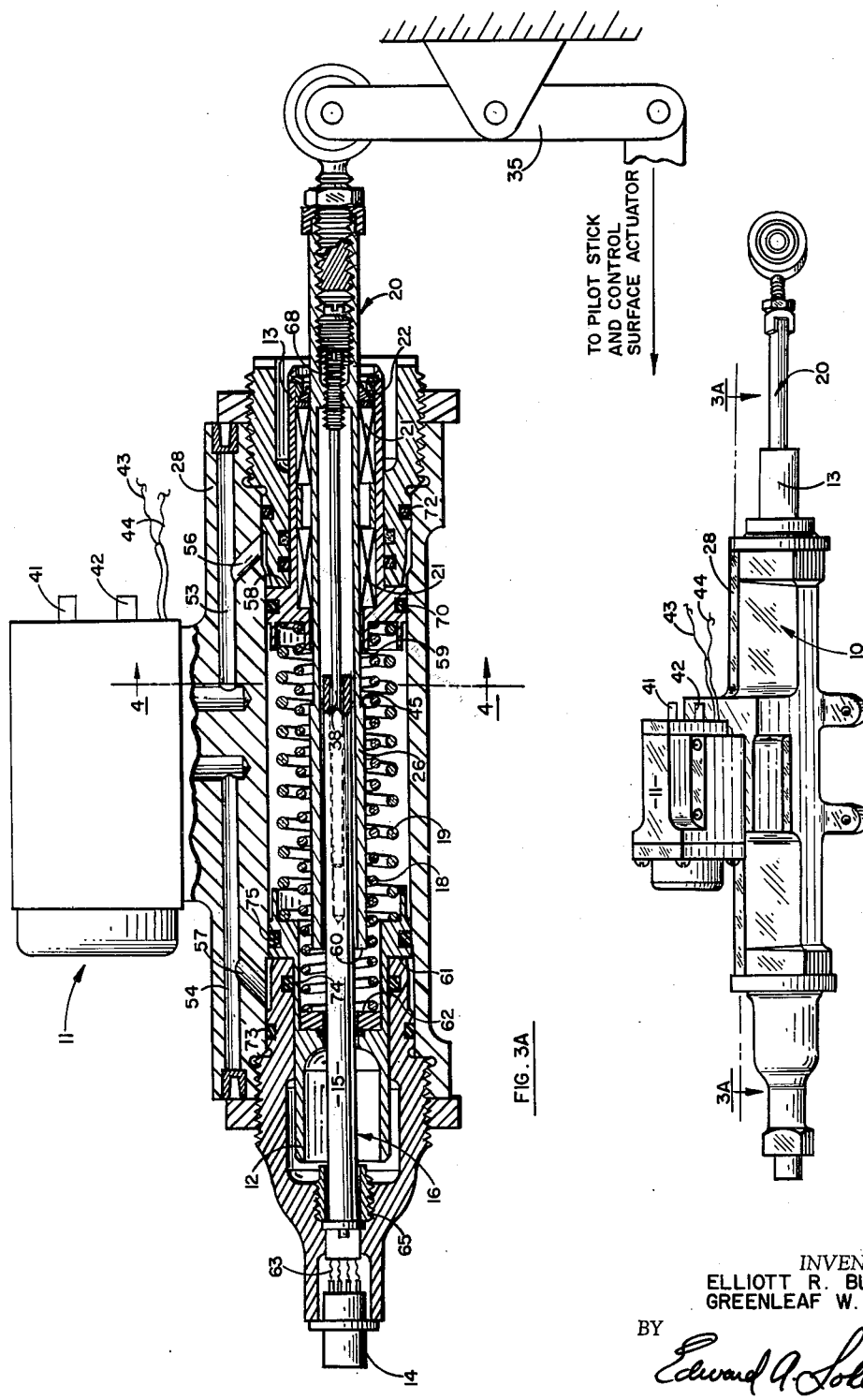

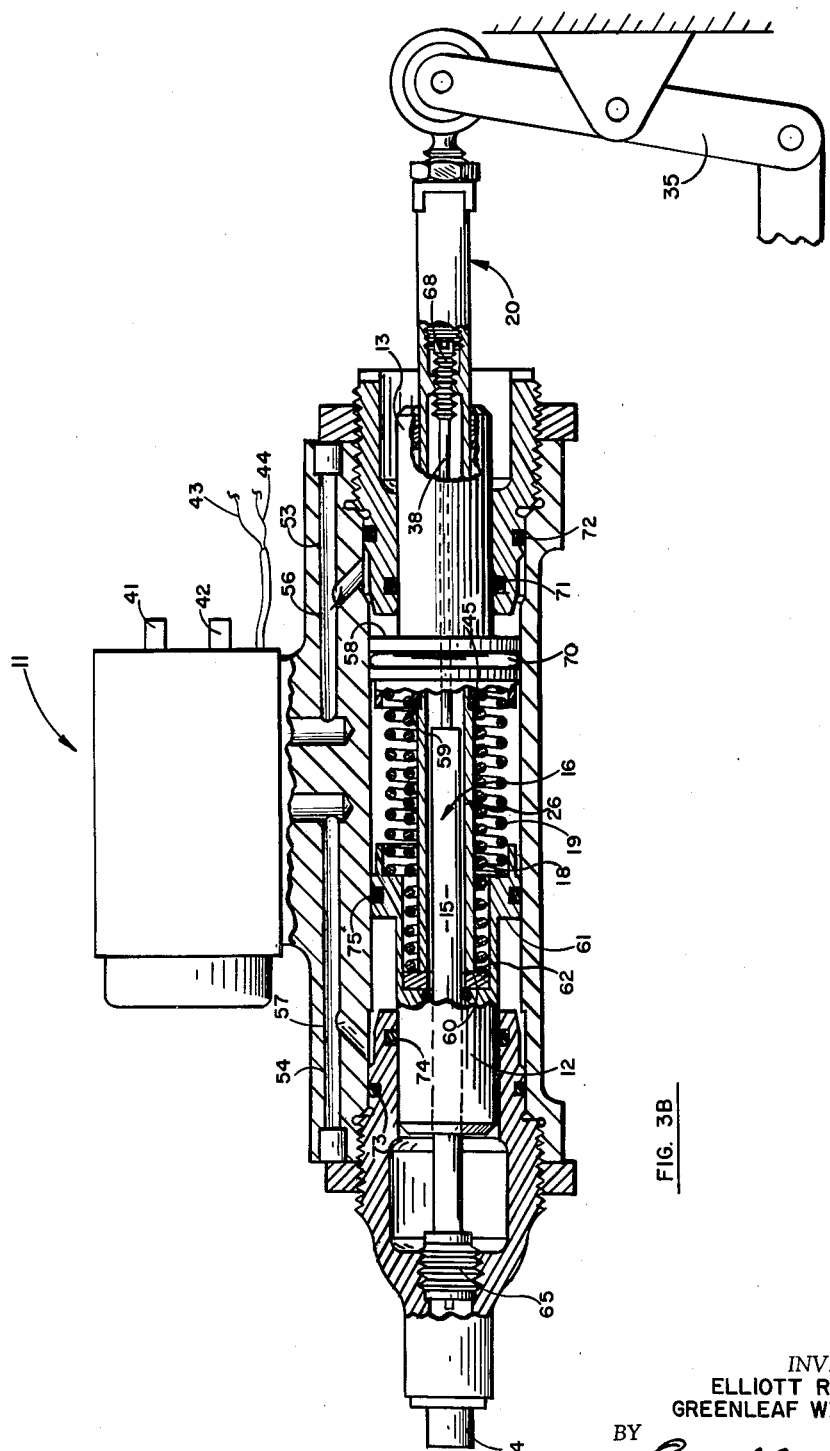

United States Patent Office 2,987,048
Patented June 6, 1961

2,987,048
PARALLEL DRIVE ACTUATOR FOR FLIGHT
CONTROL SYSTEMS
Elliott R. Buxton, Downey, and Greenleaf W. Sargent, Fullerton, Calif., assignors to North American Aviation, Inc.
Filed Oct. 20, 1959, Ser. No. 847,554
9 Claims. (Cl. 121—41)

This invention relates to a parallel drive actuator for flight control systems and more particularly to such an actuator in which there is no drag on the pilot's stick from the automatic flight control linkages during manual operation.

In most present day aircraft, provisions are made for automatic control by autopilot with switchover to manual control available instantaneously at the pilot's option. In most systems adapted for autopilot control, there is a draw on the stick when the pilot assumes manual control due generally to friction in the linkages with the autopilot tie-in. Many aircraft require a parallel drive actuator connected both to the autopilot hydraulic control and to the pilot's stick to allow for quick change-over from automatic to manual control. The use of such a parallel drive actuator in prior devices has produced an especially large amount of friction for the pilot to overcome while operating the control surfaces manually due in most instances to the drag caused by O-ring seals in the autopilot hydraulic system during the manual mode of operation. Some attempt has been made to develop a low friction seal but to date this approach to the problem has proven inadequate.

The device of this invention provides means for eliminating all drag from autopilot linkages during manual control. This is accomplished by a system whereby dual pistons are used to provide actuation from the autopilot controlled actuator for the control surface linkages. The two pistons are forced together by fluid pressure in response to the autopilot servo system. During manual control when the fluid pressure is released, the pistons are forced apart by spring means. The control surface linkage shaft is then completely free to move in accordance with motion of the pilot's stick with little or no friction being caused by the flight control servo system linkages.

It is therefore an object of this invention to provide an improved parallel drive actuator for flight control systems.

It is a still further object of this invention to eliminate drag on the pilot's stick after switching from automatic to manual operation in a flight control system.

It is a still further object of this invention to provide simple yet effective means for minimizing friction in the control surface linkages during manual operation of an aircraft.

It is still a further object of this invention to facilitate the pilot's control of an aircraft having automatic flight control equipment.

Other objects of this invention will become apparent from the following description taken in connection with the accompanying drawings in which:

FIG. 2 is a perspective view of a preferred embodiment of the device of the invention;

FIG. 3a is a cross-sectional view as taken along the line 3—3 as indicated in FIG. 2 showing the device of the invention during manual control;

FIG. 3b is an elevation view of the embodiment of FIG. 2 with partial cutaway section showing the actuator during autopilot control;

Figure 4:
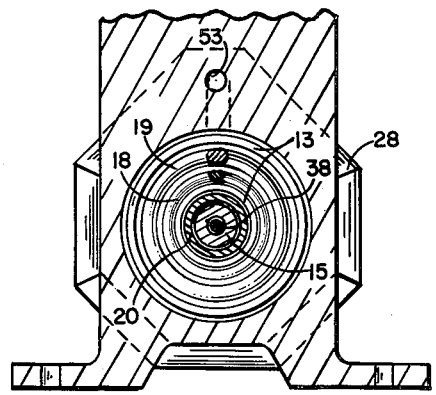

And FIG. 4 is a cross-sectional view taken along the line 4—4 indicated in FIG. 3a.

Figure 1:
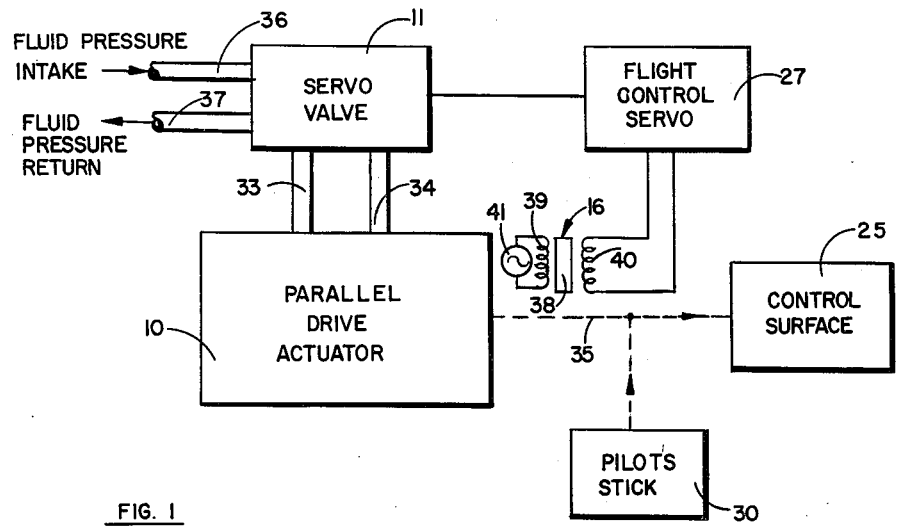
FIG. 1 is a block diagram of the device of the invention as used in conjunction with associated equipment.

Referring now to FIG. 1, a block diagram illustrating the operation of the device of this invention in conjunction with associated equipment is illustrated. Servo valve 11 and flight control servo 27 comprise a servo system which operating together provide a fluid pressure signal to control the control surfaces of an aircraft. Servo valve 11 receives a fluid pressure which may, for example, be hydraulic through channels 36 and 37. This pressure may be generated by a pump (not shown). Servo valve 11 is a regulating valve which is controlled by an electrical input signal coming from a flight control servo 27 which in response thereto produces a fluid output signal of a magnitude and direction responsive to the electrical control signal. Servo valve 11 will therefore produce a fluid output through channels 33 and 34, the difference between the fluid pressures in these channels being directly proportional to the electrical control signal fed to servo valve 11 from flight control servo 27. The pressure in channel 33 may exceed the pressure in channel 34 or vice-versa depending upon the sense of this electrical input. A typical servo valve which may be used for servo valve 11 is described in Patent Number 2,800,143, entitled "Hydraulic Regulating Valve," issued July 23, 1957, inventor George R. Keller.

Fluid pressure lines 33 and 34 are connected to the parallel drive actuator 10 where, as to be described in detail further on in the specification, their pressure signals are utilized to drive the actuator in accordance with the electrical control signal. As will later be shown, when there is no electrical input from the control servo 27, the drive shaft of actuator 10 is free to move in accordance with the movements of pilot stick 30. The output of actuator 10 is mechanically coupled by means of mechanical linkage 35 to control surface 25. In automatic control, control surface 25 will be moved in accordance with the output of the flight control servo 27. During manual control, control surface 25 will be moved in accordance with pilot stick 30.

A negative feedback signal responsive to the mechanical output of actuator 10 is provided for the flight control servo 27 by means of linear differential transformer 16 also commonly called a linear motion transducer. Transformer 16 is a well known commercially available item having a movable core 38, a primary winding 39 and a secondary winding 40. Primary winding 39 is excited by an A.-C. reference source 41. The voltage coupled from primary winding 39 to secondary winding 40 is a function of the position of the transformer core 38. Therefore, as this core 38 is moved in accordance with the mechanical output of actuator 10, the voltage across secondary winding 40 which is fed as negative feedback to servo 27 will vary. By appropriately arranging the position of the core 38 relative to windings 39 and 40 for various positions of mechanical output linkage 35, an output voltage across winding 40 for use as a negative feedback signal to control servo 27 can be obtained.

Now that we have examined the operation of the parallel drive actuator 10 in conjunction with flight control system, let us look to the details of the parallel drive actuator 10 to show how drag on the pilot's stick is eliminated. The details of the actuator are shown in FIGS. 2, 3a, 3b, and 4.

FIG. 2 is a perspective drawing of the device of the invention. Servo valve 11 is mounted on the case 28 of actuator 10. Pressure intake and return is fed through ports 41 and 42. Drive shaft 20 is slidably mounted within case 28 and slides within piston 13 which is externally concentric therewith. Electrical input signals for the control of servo valve 11 are coupled through input leads 43 and 44.

Let us now refer to FIGS. 3a and 4. In FIG. 3a the device of the invention is illustrated in cross-section as taken along a plane represented by the line 3a—3a in FIG. 2. FIG. 3a shows the pistons 12 and 13 in the positions they will assume during operation in the manual mode. FIG. 4 is a cross-sectional view as taken along a plane represented by the line 4—4 in FIG. 3a. Actuator drive shaft 20 is slidably mounted on ball bushings 21 which reduce the friction level to a few ounces. A low friction Teflon scraper 22 keeps foreign matter from entering the bushings. Drive shaft 20 has an enlarged portion 26 having a greater cross-sectional area than the remainder of the shaft. Cylindrical pistons 12 and 13 are slidably mounted in case 28 opposite each other and are respectively held away from the ends of enlarged portion 26 by the action of springs 18 and 19. During manual operation there is no electrical drive signal from the control servo and no fluid pressure output in channels 53 and 54 from servo valve 11 to drive pistons 12 and 13 counter to the urging action of springs 18 and 19. Shaft 20 is therefore free to move within adequate limits in accordance with the motion of the pilot's stick (not shown), such stick being mechanically coupled to mechanical linkage 35. As can be seen, there is no friction on shaft 20 due to O ring seals or other devices associated with the fluid control system.

Referring now to FIG. 3b, the actuator is illustrated with pistons 12 and 13 in the positions they will assume relative to shaft 20 during the automatic control mode. Fluid pressure supplied from servo valve 11 will force fluid through channels 53 and 54 on through channels 56 and 57 to drive the actuation surface 58 of piston 13 until one of its end surfaces 59 abuts against surface 45 on the end of enlarged portion 26 of shaft 20 and will drive the actuation surface 61 of piston 12 until one of its surface 62 abuts against the other end 60 of enlarged portion 26 of actuator shaft 20. Surfaces 45 and 60 form piston engagement portions which enable pistons 12 and 13 operating together to effectively grip shaft 20. The two pistons 12 and 13 will be moved backwards and forwards in accordance with differences in pressures in channels 53 and 54 to form the driving elements of a fluid motor which will drive actuator shaft 20. Thus, actuator shaft 20 will be moved in response to the autopilot controlled servo valve 11. The feedback signal for the servo system is provided through electrical receptacle 14 which receives electrical signals from the linear differential transformer 16 through electrical leads 63 (see FIG. 3a). Linear differential transformer 16 whose operation is described in conjunction with FIG. 1 has a primary winding 39 (FIG. 1) for providing a reference signal and a secondary winding 40 (see FIG. 1) wherein the desired output is produced. The core 38 of transformer 16 is fixedly attached to the actuator shaft 20 by means of screw 68 and moves in accordance therewith. The primary and secondary windings of this transformer 16 are wound within tubular support form 15 which is fixedly attached to the case 28 by means of threaded attachment 65. O rings 70, 71, 72, 73, 74 and 75 are utilized to provide proper sealing for the fluid control system.

The device of this invention thus provides a simple yet effective way for eliminating drag on a pilot's stick in automatic flight control systems.

Although this invention has been described and illustrated in detail, it is to be clearly understood that the same is by way of illustration and example only, and is not to be taken by way of limitation, the spirit and scope of this invention being limited only by the terms of the appended claims.

We claim:

1. An actuator comprising a motor having a pair of driven elements relatively movable upon energization of said motor, said shaft having first and second portions thereof positioned to engage respective driven elements of said motor and limit said relative motion of said driven elements, said motor including means for effecting unitary motion of said driven elements and shaft when said relative motion is limited, and means for urging each said element away from its respective shaft engagement position.

2. A parallel drive actuator comprising a case, an actuator shaft slidably mounted within said case, first and second pistons slidably mounted within said case, said actuator shaft having first and second oppositely facing piston engagement surface portions, means for driving said pistons towards each other with said first piston abutting against one of said engagement portions and said second piston abutting against the other engagement portions, and spring means for providing forces urging said pistons apart and away from said engagement portion of said shaft.

3. The device as recited in claim 2 and further including a control servo, said means for driving said pistons comprising a servo valve responsive to said control servo, said case having first and second channels, each of said channels interconnecting said servo valve and the actuation surface of a separate one of said first and second pistons respectively.

4. A parallel drive actuator for flight control systems comprising a case, an actuator shaft slidably mounted within said case, a first cylindrical piston externally concentric with said actuator shaft, said actuator shaft having first and second oppositely facing piston engagement surface portions, a second cylindrical piston externally concentric with said actuator shaft, said pistons being slidably mounted within said case opposite each other, means for driving said pistons towards each other with said first piston abutting against one of said engagement portions of said actuator shaft and said second piston abutting against the other of said engagement portions of said shaft, and spring means for providing forces urging said pistons apart and away from the engagement portions of said shaft.

5. A parallel drive actuator for flight control systems comprising a case, an actuator shaft slidably mounted within said case, a first cylindrical piston externally concentric with said actuator shaft, said actuator shaft having an enlarged portion, a second cylindrical piston externally concentric with said actuator shaft, said pistons being slidably mounted within said case opposite each other, fluid pressure means for driving said pistons towards each other with said first piston abutting against one end of the enlarged portion of said actuator shaft and said second piston abutting against the other end of the enlarged portion of said shaft, said piston driving means comprising a servo valve, said case having a pair of channels therein, each of said channels connecting an output of said servo valve to the actuating surface of a separate one of said pistons, and spring means for providing forces urging said pistons apart and away from the enlarged portion of said shaft.

6. In combination, a parallel drive actuator and a servo system for controlling said actuator, said actuator comprising a case, a drive shaft slidably mounted within said case, said drive shaft having an enlarged portion, first and second pistons, said pistons being slidably mounted within said case opposite each other, spring means for urging said pistons apart, said case having separate channels for conveying fluid pressure to the actuation surfaces of said first and second pistons, said channels being connected to receive a fluid pressure output signal from said servo system, each of said pistons being driven into engagement with a respective one of the opposite ends of the enlarged portion of said shaft against the action of said spring means in response to the fluid pressure output signal from said servo system, whereby said shaft is actuated in response to said fluid pressure output signal and is freely slidable in the absence of such output signal.

7. In combination, a parallel drive actuator and a servo system for controlling said actuator, said actuator comprising a case, a drive shaft slidably mounted within said case, said drive shaft having an enlarged portion of increased cross-sectional area, first and second pistons externally concentric with said drive shaft, said pistons being slidably mounted within said case opposite each other, spring means for urging said pistons apart and away from the enlarged portion of said shaft, said case having a first channel for conveying fluid pressure to the actuation surface of said first piston, said case having a second channel for conveying fluid pressure to the actuation surface of said second piston, said first and second channels being connected to receive a fluid pressure output signal from said servo system, each of said pistons being driven into engagement with a respective one of the opposite ends of the enlarged portion of said shaft against the action of said spring means in response to the fluid pressure output signal from said servo system, whereby said shaft is actuated in response to said fluid pressure output signal and is freely slideable in the absence of such output signal.

8. The device as recited in claim 7 wherein is additionally included a linear differential transformer having a core and primary and secondary windings, said core being movable relative to said windings, said transformer core being fixedly attached to said drive shaft, said transformer windings being fixedly attached to said case, the secondary windings of said transformer being connected to said servo system.

9. In combination, a parallel drive actuator for driving a control surface of an aircraft, said actuator output being mechanically attached to a pilot's stick, and a servo system for controlling said actuator, said actuator comprising a case, a drive shaft slidably mounted within said shaft, said drive shaft being mechanically coupled to said control surface and said pilot's stick, said drive shaft having an enlarged portion of increased cross-sectional area, first and second pistons slidably mounted within said case facing each other, said pistons being externally concentric with said shaft, first and second springs interposed between said pistons for urging said pistons apart, said case having a first channel for conveying fluid pressure from said servo system to the actuation surface of said first piston, said case having a second channel for conveying fluid pressure from said servo system to the actuation surface of said second piston, means for maintaining a fluid seal between said pistons and said case, each of said pistons being driven into engagement with a respective one of the opposite ends of the enlarged portion of said shaft counter to the action of said springs in response to the fluid pressure output signal from said servo system, and a linear differential transformer having a core fixedly attached to said drive shaft and primary and secondary windings fixedly attached to said case, said core being movable relative to said windings, said secondary windings being connected to provide negative feedback to said servo system.

References Cited in the file of this patent
UNITED STATES PATENTS

| | | |
|---|---|---|
| 2,352,140 | Trott | June 20, 1944 |
| 2,380,510 | Fitch | July 31, 1945 |